Nov. 11, 1924.  1,515,452
S. WEBB ET AL
SAFETY SUSPENDING APPARATUS FOR MINE CAGES AND LIFTS
Filed Feb. 1, 1924     2 Sheets-Sheet 1
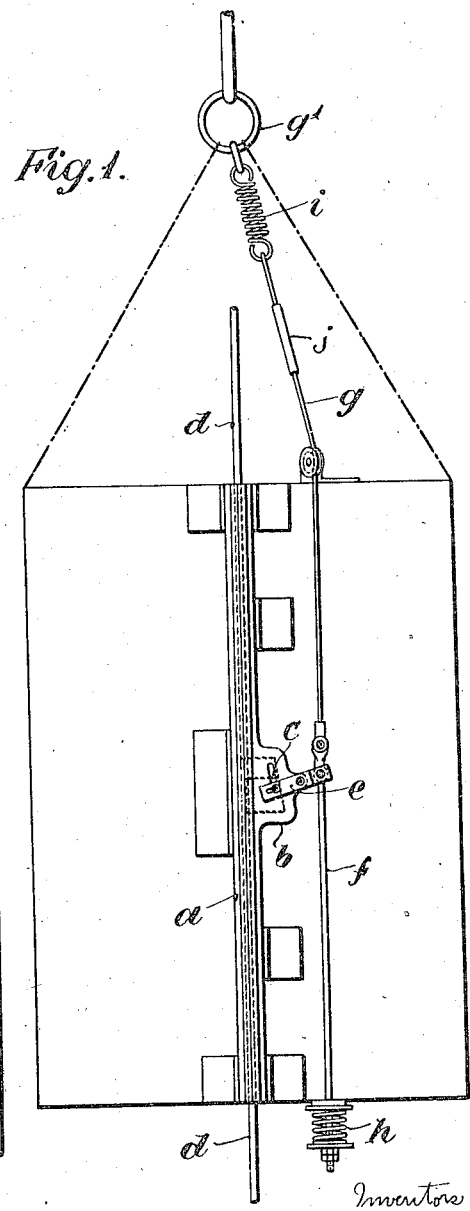
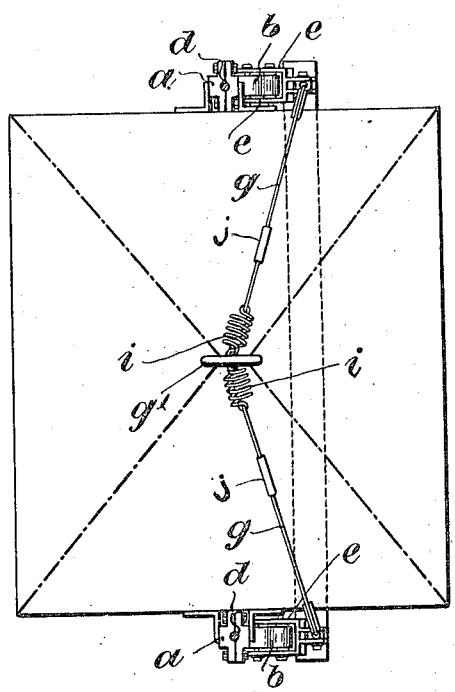
Inventors:—
Samuel Webb & Horace C. Guest,
By:— Fowler and Smith,
Attorneys.

Nov. 11, 1924.                                         1,515,452
S. WEBB ET AL
SAFETY SUSPENDING APPARATUS FOR MINE CAGES AND LIFTS
Filed Feb. 1, 1924                    2 Sheets-Sheet 2

Inventors:—
Samuel Webb & Horace C. Guest,
By:
Fowler & Smith,
Attorneys.

Patented Nov. 11, 1924.

1,515,452

UNITED STATES PATENT OFFICE.

SAMUEL WEBB AND HORACE CROMWELL GUEST, OF DUDLEY, ENGLAND.

SAFETY SUSPENDING APPARATUS FOR MINE CAGES AND LIFTS.

Application filed February 1, 1924. Serial No. 690,066.

*To all whom it may concern:*

Be it known that SAMUEL WEBB and HORACE CROMWELL GUEST, subjects of the King of Great Britain, residing at 130 Oakham Road, Dudley, in the county of Worcester, England, have invented certain new and useful Improvements in Safety Suspending Apparatus for Mine Cages and Lifts, of which the following is a specification.

Our invention has reference to safety suspending apparatus for use in connection with mine-cages and lifts that run on stationary guides or conductors (such as guide-ropes, rails, or their equivalent) and relates in particular to apparatus of the type comprising a system of gripper-slides that are normally held out of action by virtue of their connection with the winding-rope and are also influenced by springs or weights that likewise are normally restrained by the rope but function to make the grippers secure the cage to its guides in the event of the winding rope breaking or becoming disconnected from the cage.

Our said invention consists in a new or improved suspension apparatus comprising essentially a spring or weight actuated gripper enclosed in a housing that is mounted on or forms part of the guide-rope slipper, an actuating and control lever that is fulcrumed directly on the gripper-housing, and a master control-spring which is interposed between the lever and the winding-rope and serves to hold the gripper out of action during normal working and to prevent snatch or strain on the suspension system when winding is re-started following a break in the winding rope or after the cage has been intentionally anchored to its guides by the suspension gear.

The improved system preferably also includes a regulating or adjusting screw adapted to serve a dual purpose in the sense that it not only provides for the regulating of the springs and the adjustment of the gripper-slides in their housings, but also affords a convenient means of easing the master-spring tension off the control system and thus allowing the grippers to be operated for suspending the cage by its guides and independently of the winding-rope.

A system embodying such a screw thus permits of a cage being lowered to any place in the shaft and there anchored to the guide ropes merely by turning the said screw to a sufficient extent to allow of the operating springs or weights bringing the grippers into action.

The accompanying drawings show the application of our invention to a safety suspension gear for colliery-cages.

Figure 1 is a diagram showing the general arrangement of the system and illustrating the normal dispositions of the various parts.

Figure 2 is a plan of Figure 1.

The same letters of reference indicate corresponding parts in the several figures of the drawings.

As shown in the diagrams of the system, Figures 1 and 2, each of the guide-rope slippers $a$ of the cage embodies a gripper-box $b$, the interior of which opens, on the side $b'$, into the rope-way $a'$ of the slipper, whereas the opposite side is formed with an inclined plane or surface $b^3$; this box constituting a wet-proof housing for a gripper-member or block $c$ having a perpendicular side $c'$ opposed to the guide-rope $d$ and an inclined side $c^2$ corresponding to and opposed to the inclined plane surface $b^3$; the arrangement being such that vertical displacement of the block within the box will impart a lateral movement to the former for starting or bringing about the gripping of the guide-rope between the said block and the opposed solid side of the slipper rope-way.

Figure 3:
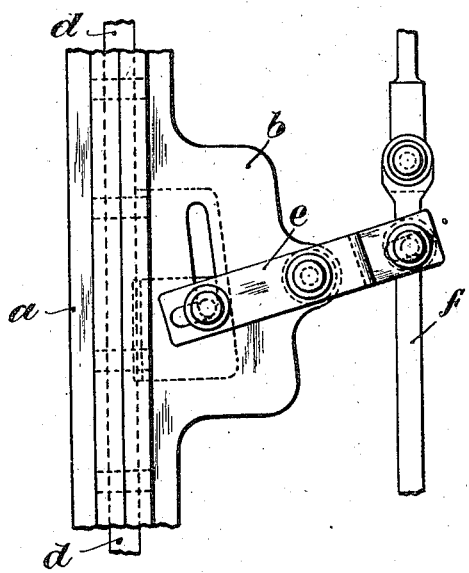
Figure 3 shows, in side elevation, a guide-rope slipper attachment embodying the gripper device and the connections between the moving member of the gripper and the controls.
Figure 5:
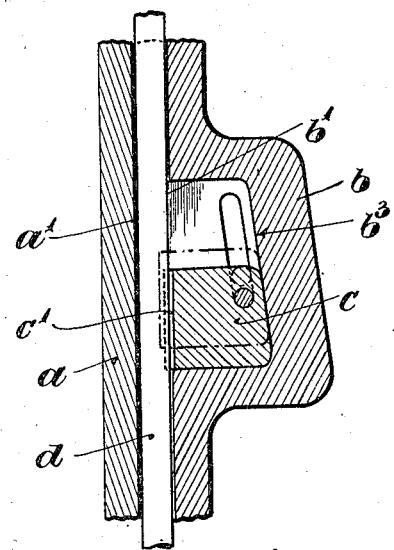
Figure 5 is a vertical section of the slipper attachment showing the movable gripper-member as in normal or inoperative position.
Figure 4:
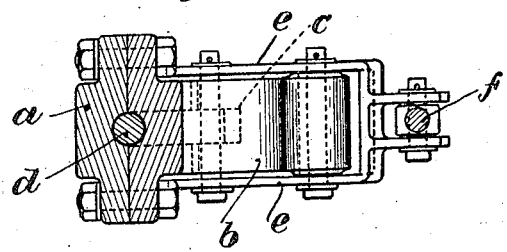
Figure 4 is a sectional plan of Figure 3.
Figure 6:
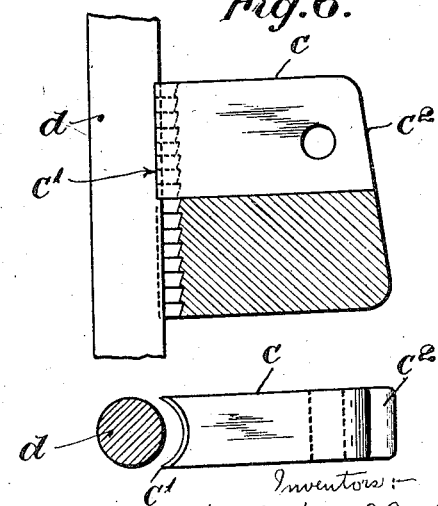
Figure 6 shows in two views a sectional elevation and a plan respectively of the gripper-member separately.

To adapt the block to grip a guide-rope with a substantially positive action when the cage-weight is translated by the inclined or wedge surfaces, into a lateral thrust on the said block, its perpendicular face is concaved and formed with downwardly-inclined teeth as shown in Figure 6, and it is linked, by suitably-mounted external levers $e$ to an operating and control rod $f$, which is fulcrumed directly on the gripper-housing and is connected, on the one hand, with a restraining cable that is connected, through a master-spring $i$, to the anchor-ring $g'$ of the bridle-chains, and on the other hand, with an operating spring $h$. This latter member, in the system illustrated, takes the form of a compression spring which is interposed between abutments on the cage and on the rod $f$ as shown in Figure 1, and tends to displace the said rod in a direction that will, through the levers $e$, displace the gripper-block upwardly in its box or shift the same from its normal position into its guide-rope gripping position. Normally, however, and so long as taut connection is maintained between the anchorage $g'$ and the rod $f$ by or through the spring $i$ and cable $g$, the spring $h$ is dominated or held in compression and under restraint, and the gripper-block is kept at the bottom of its box and clear of the guide rope.

But should the winding rope break, or if the system be intentionally relieved of the restraint normally imposed by the spring $i$ acting through cable $g$, the springs $h$ of the safety devices immediately expand and by depressing the rods $f$ and rocking the levers $e$, displace the gripper blocks within their boxes in the direction that will bring their toothed surfaces into engagement with the ropes and start a practically positive gripping action which is maintained by the weight of the suspended cage.

The springs $i$ not only normally dominate the springs $h$ and hold the grippers out of action, but also serve to delay the release of the grippers until (on winding up being started after re-connection of the winding rope to the bridle chains following a break, or after the cage has been intentionally suspended from its guide-ropes by the suspension gear) the bridle-chains have been wound up so taut as to bring the weight of the cage on to the rope or practically so. Thus it will be understood that if no springs such as $i$ were embodied in the system, or if the control cable $g$ were connected to its anchorage-ring without the intervention of a resilient medium, the whole weight of the cage might, on commencing to wind up as stated, be brought onto the control-cable in advance of the cage load being taken by the bridle-chains, and if this loading did not snap the said cable, it might impose severe strains on the mechanism of the safety devices or so prematurely release the said devices as to allow the cage to fall a sufficient distance to impose a sudden snatch on the bridle-chains and other parts of the system. When, however, springs such as $i$ are used in conjunction with a restraining cable of suitable length, the first pull of the winding rope is transmitted to the spring $i$ and is expended in distending or tensioning the same, without transmitting movement to the restraining cable. During this stage of winding, the spring $i$ thus acts as a release-delaying device for the gripper-system, whereas by the time winding has been continued so far as to take up the slack in the bridle chains the cage weight is about to be taken by the rope, the spring has become so tensioned that as to overcome the weight or resistance of the operating springs $h$ and other parts and actuates the levers $e$ in the release direction for disengaging the gripper blocks from the guide ropes, and again compress the said springs $h$; the springs $i$ thus being the dominating factor of the system so long as the bridle-chains are in taut connection with the winding rope.

A regulating or adjusting screw $j$, which may be a turn buckle of conventional construction and operation, is introduced between each master spring and restraining cable for regulating spring tension and adjusting the gripper blocks in their respective boxes to ensure that they shall not foul or rub on the guide-ropes under normal conditions. This screw also enables the master spring tension to be eased off for allowing the gripper to act when it is desired to use the safety system for suspending the cage from its guides and independently of the winding rope.

In all applications of the invention, breakage or fouling of the control cables connecting the safety devices with the winding rope cannot give rise to an accident or damage as if either control-cable should break whilst a cage is descending, the operating springs or weights at once act to bring the grippers into play and arrest the cage as already described, whereas if the break in the control-cables should occur during winding up, nothing happens till the cage or lift is stopped, as the upward drag of the gripper blocks against the guides or ropes keeps them out of action, but immediately on reversing to descend, the safety devices would come into action and lock the cage at a standstill at the top of the shaft.

The application of the invention to lifts, elevators and analogous purposes differs in no essential respect from its application to colliery cages as herein described.

Having described our invention, what we claim and desire to secure by Letters Patent is:—

1. A safety suspension device for mine cages and the like, comprising a guide-rope slipper, a spring actuated gripper enclosed in a housing mounted on or forming a part of said guide-rope slipper, a gripper-actuating and control lever fulcrumed directly on the gripper housing, a winding rope for the cage, and a master control spring interposed between the said lever and the winding rope, for the purposes herein set forth.

2. A safety suspension device for mine cages and the like, comprising a guide-rope slipper, a spring actuated gripper enclosed in a housing mounted on or forming a part of said guide-rope slipper, a gripper-actuating and control lever fulcrumed directly on the gripper housing, a winding rope for the cage, a master control spring interposed between said lever and winding rope, and a regulating and adjusting screw interposed between the said lever and master control spring, for the purposes herein set forth.

In testimony whereof they hereunto affix their signatures.

SAMUEL WEBB.
HORACE CROMWELL GUEST.